United States Patent

Henry

[15] 3,694,721
[45] Sept. 26, 1972

[54] SYSTEM TO CONTROL PLUGGING OF VEHICLE DIRECT CURRENT MOTOR

[72] Inventor: Luke F. Henry, Homewood, Ill.

[73] Assignee: Allis-Chalmers Corporation, Milwaukee, Wis.

[22] Filed: Aug. 31, 1971

[21] Appl. No.: 176,591

[52] U.S. Cl. .................................318/341, 318/373
[51] Int. Cl. .............................................H02r 5/06
[58] Field of Search............318/341, 371, 373–376, 318/387, 599

[56] References Cited

UNITED STATES PATENTS 3,569,810  3/1971  Thiele.........................318/341
3,551,769  12/1970  Tedd.........................318/373 X
3,188,545  6/1965  Sheheen...................318/341 X

*Primary Examiner*—Bernard A. Gilheany
*Assistant Examiner*—W. E. Duncanson, Jr.
*Attorney*—Lee H. Kaiser et al.

[57] ABSTRACT

A soft-plugging control for a DC traction motor has a speed rheostat which regulates the duty cycle of variable width pulses applied by a power switch from a battery to the motor armature, means for algebraically summing the voltage across the power switch and the armature and means for decreasing the repetition rate of the pulses when said algebraic sum decreases below a predetermined magnitude as the armature voltage decays when said armature reverses direction.

17 Claims, 1 Drawing Figure

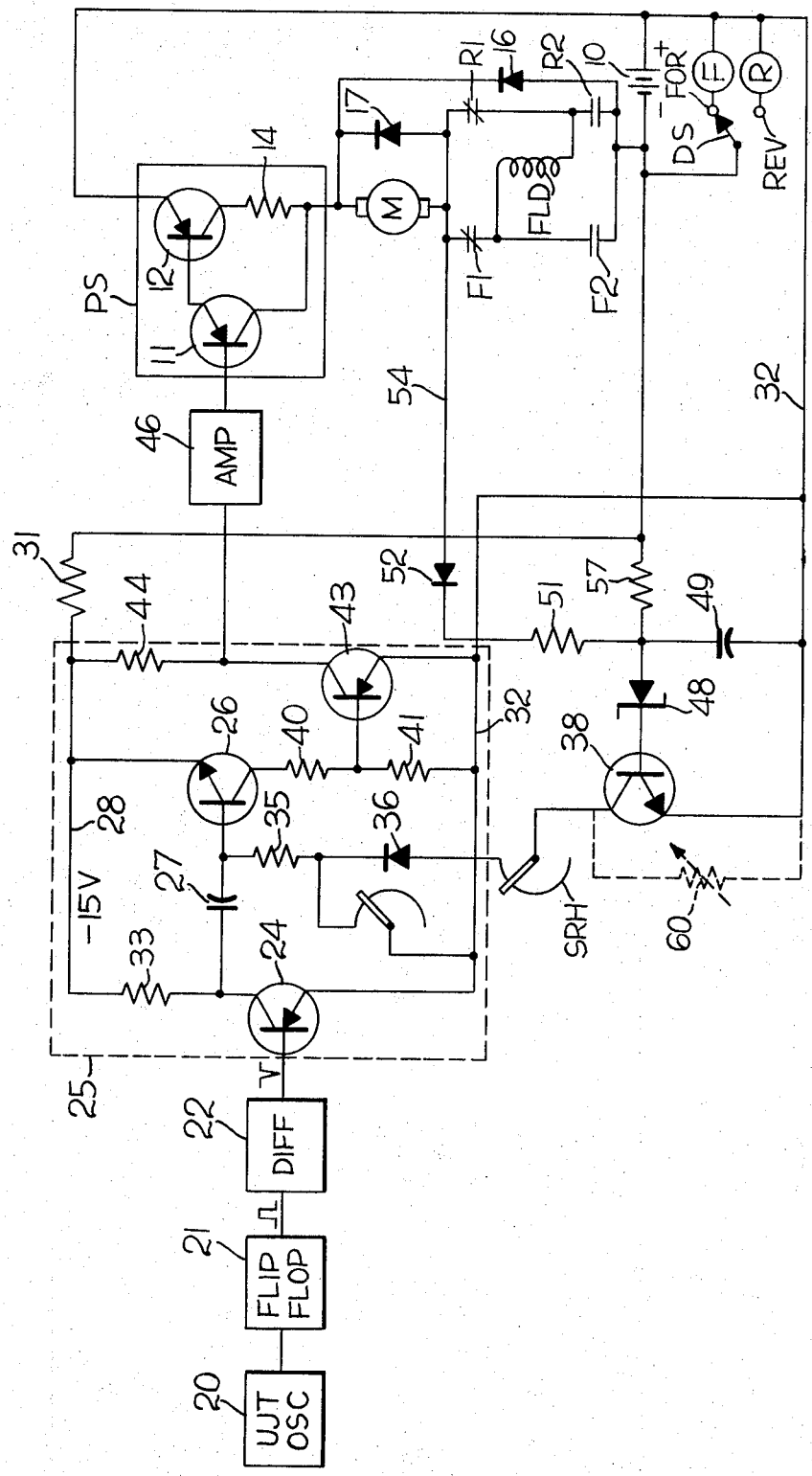

3,694,721

SYSTEM TO CONTROL PLUGGING OF VEHICLE DIRECT CURRENT MOTOR

This invention relates to a control for providing varying duty cycle pulsing of a direct current traction motor from a storage battery and in particular to a control for the plugging of such a motor.

BACKGROUND OF THE INVENTION

Pulse width modulation motor control systems are disclosed in U.S. Pat. Nos. 3,358,206 and 3,569,810 of this assignee wherein the operator of an industrial truck can adjustably regulate the time duration, or duty cycle, of direct current pulses applied to the direct current traction motor of the truck by controlling the switching of a power transistor interconnecting the battery and the motor. In such a motor control system, an RC circuit in which a timing capacitor is discharged through a speed rheostat controls the point during each cycle at which conduction by the power transistor is initiated, and the truck operator steps on a foot accelerator which adjusts the speed potentiometer to control the initiation of conduction by, and thus the duty cycle of, the power transistor. The operator inherently releases the accelerator when changing the direction in which the truck is being driven. When the accelerator is released, the speed rheostat is automatically returned to the position where maximum resistance is in the capacitor discharge circuit so that the power transistor never begins to conduct during each cycle. Although this feature prevents energization of the motor during the interval that the operator takes his foot off the accelerator, the truck is not decelerated sufficiently under all conditions to prevent jolts and jerking when the direction of the truck is reversed. If the driver intentionally attempts to abuse the truck, the change of direction of the motor can be so rapid as to damage the load on the truck and even snap the truck axle.

OBJECTS OF THE INVENTION

It is an object of the invention to provide an improved pulse width modulation control system for a direct current traction motor which regulates motor torque during reversal of direction so as to provide smooth, safe, rapid direction changes without jolts and jerks. It is a further object of the invention to provide such an improved pulse width modulation system for a traction motor which prevents abuse of the drive motor by the operator and softly plugs the motor during reversal of direction to minimize damage to the motor and to the load on the vehicle.

DESCRIPTION OF THE DRAWING

These and other objects and advantages of the invention will be more readily apparent from the single FIGURE of the drawing which is a schematic wiring diagram, partially in block form, of a pulse width modulation control system embodying the invention.

DETAILED DESCRIPTION

The invention will be described as an improvement over the motor control system of aforesaid U.S. Pat. No. 3,358,206. The armature M of a direct current traction motor is connected through the contacts of a forward relay F and reverse relay R in series with the field winding FLD of the motor and a direct current power source 10, such as a 36 volt battery, by a power transistor switch PS. Power switch PS may comprise a plurality of power transistors 12 in parallel and is schematically shown as a Darlington circuit with the emitter of a base drive transistor 11 connected to the base of a power transistor 12 and the emitter-collector circuit of power transistor 12 in series with motor armature M. A small collector resistor 14 forward biases the collector-base junction of the power transistor 12 to maintain it in the saturated region of operation as disclosed in U.S. Pat. NO. 3,517,282 of this same assignee. The movable contact DS of a manually operable direction switch is shown connected to the negative terminal of battery 10, and the stationary contacts FOR and REV which can be selectively engaged by the movable contact DS are schematically illustrated as connected to one side of the operating coils of forward and reverse relays F and R respectively with the opposite side of the relay coils commoned and connected to the positive terminal of battery 10. When the operator of the truck actuates directional switch DS into engagement with stationary contact FOR, the operating coil of forward relay F is energized and it operates to open normally closed contacts F1 and close normally open contacts F2 and thereby connect field winding FLD in a direction to drive the truck forward. Similarly when the truck operator actuates directional switch DS into engagement with stationary contact REV, the operating coil of reverse relay R is energized and it operates to open normally closed contacts R1 and close normally open contacts R2 to thereby connect field winding FLD in the reverse direction. A free-wheeling diode 16 is connected across armature M and field winding FLD to provide a current discharge path for induced currents when the power switch PS is turned off. An armature diode 17 connected across armature M bypasses current generated in the armature M during rapid reversals of direction of the motor.

PULSE WIDTH MODULATION

A unijunction oscillator 20 shown in block form generates pulses at a predetermined frequency, for example, at 120 pulses per second, which are shaped to rectangular form by a flip-flop 21 also shown in block form. The square wave output pulses from flip-flop 21 are converted to sharp negative-going pulses in a differentiating circuit 22 shown in block form.

Each sharp negative-going pulse from differentiating circuit 22 is applied to the base of a PNP transistor 24 and turns it on for the duration of the pulse. Transistor 24 is part of a monostable multivibrator 25 shown within the dotted line rectangle and disclosed in U.S. Pat. NO. 3,358,206 and also disclosed in U. S. Pat. NO. 3,433,120 having the same assignee as this invention. The base of a NPN transistor 26 is coupled through a timing capacitor 27 to the collector of transistor 24, and the emitter of transistor 26 is connected to a −15 volt bus 28 which is coupled through a series dropping resistor 31 to the negative terminal of battery 10. When transistor 24 conducts, the increase of potential at its collector is coupled through timing capacitor 27 to the base of NPN transistor 26 and turns it on. Also when transistor 24 turns on, the electrode of timing capacitor 27 connected to the collector of transistor 24 is effectively coupled to a common conductor 32 which is schematically shown as connected to the positive terminal of battery 10. Current flows from common conductor 32, the emitter-collector circuit of transistor 24, timing capacitor 27, and the base-emitter junction of transistor 26 to the −15 volt bus 28. This charges timing capacitor 27 to approximately 15 volts with the positive side on the left electrode as seen in the drawing.

When transistor 24 turns off at the end of each sharp pulse, the positively charged electrode of timing capacitor 27 is connected to the −15 volt bus 28 through collector resistor 33. This makes the negatively charged electrode of timing capacitor 27 more negative than bus 28, thereby making the base of transistor 26 more negative than its emitter and turning it off.

With transistor 26 turned off, timing capacitor 27 begins to discharge from its negatively charged electrode through a resistor 35, a diode 36, speed rheostat SRH, the collector-emitter circuit of a normally conducting transistor 38 of the plugging control circuit, common conductor 32, battery 10, series dropping resistor 31, the −15 volt bus 28, and resistance 33 to the positively charged plate of timing capacitor 27. The setting of speed rheostat SRH thus determines the time interval required to discharge timing capacitor 27.

The collector of transistor 26 is connected in series with two resistors 40 and 41 to common conductor 32, and the junction between resistors 40 and 41 is connected to the base of a transistor 43 having its emitter-collector circuit connected in series with a collector resistor 44 between common conductor 32 and the −15 volt bus 28. As long as the charge on timing capacitor 27 keeps transistor 26 turned off, the base of PNP transistor 43 is reverse biased and the power switch PS is turned off. When timing capacitor 27 has discharged to a sufficiently low voltage, transistor 26 turns on and forward biases the base of transistor 43 to turn it on. When transistor 43 conducts, the change of potential at its collector is amplified by an amplifier 46 shown in block form and turns on base drive transistor 11 and power transistor 12 to begin conduction by the power switch PS and thus initiate the duty cycle. Transistor 26 will turn on only if transistor 24 does not turn on again (in response to a succeeding sharp pulse) to recharge timing capacitor 27. The rate of discharge of timing capacitor 27, and therefore the time of turning on of transistors 26, 43 and the power switch PS, is primarily controlled by the setting of speed rheostat SRH during normal operation.

SOFT PLUGGING OF MOTOR

A zener diode 48 is connected in series with a capacitor 49 across the base-emitter junction of transistor 38. The lower electrode of capacitor 49 as shown in the drawing is connected by conductor 32 to the positive terminal of battery 10. The upper electrode of capacitor 49 is connected through a resistance 51, a diode 52 and a conductor 54 to one side of the motor armature M. The upper electrode of capacitor 49 is also connected through a charging resistance 57 to the negative terminal of battery 10. Capacitor 49 is thus connected in series with resistance 57 across battery 10, and then the circuit is initially energized capacitor 49 charges through resistance 57 to a sufficiently high potential to break down zener diode 48 and turn on transistor 38.

The potential across conductors 32 and 54 is the algebraic sum of the voltage across power switch PS and the armature voltage. This voltage is relatively high when the motor is running and diode 52 is reverse biased. The potential across charged capacitor 49 holds zener diode 48 in the conductive state and forward biases the base-emitter junction of transistor 38 and keeps it conducting during motor operation.

The discharge circuit of timing capacitor 27 is through speed rheostat SRH and the emitter-collector circuit of transistor 38, and therefore as long as transistor 38 is turned on, the speed rheostat SRH determines the discharge time for timing capacitor 27 and the point during each cycle at which conduction by the power switch PS begins.

When the truck operator reverses the direction switch DS, the polarity of field winding FLD is reversed, and the motor acts as a generator with the current from armature M flowing through armature diode 17. The voltage across armature M becomes equal to the forward drop across armature diode 17, and the algebraic sum of the power switch and armature voltage appearing across conductors 32 and 54 approaches zero. Capacitor 49 then discharges through the series arrangement of resistance 51, diode 52, armature M, and power switch 12. When the potential across capacitor 49 falls below the breakover potential of zener diode 48, transistor 38 turns off and the impedance of its emitter-collector junction rises to a high value. Since the impedance of the timing capacitor discharge path through the emitter-collector junction of transistor 38 is now very high, transistor 26 is not turned on during each input pulse and the number of pulses conducted by power switch PS drops from 120 pulses per second to approximately 12 pulses per second. The severity of plugging, i.e., the rate at which the direction of rotation of the motor armature is reversed, is dependent upon the magnitude and frequency of the current pulses to the armature. This reduction in the rate of current pulses to the armature M results in soft plugging and prevents application of full power to the motor regardless of the manner in which an operator may attempt to abuse the motor, thereby assuring smooth changes of direction of the truck without jerks or jolts.

The value of resistance 51 is chosen to be much smaller than that of resistance 57 so that the time constant of the discharge path through resistance 51 (on the order of 10 micro seconds) is considerably less than the time constant of the charging path through resistance 57 (on the order of 0.1 seconds).

After armature M has stopped, capacitor 49 charges again through resistance 57. When the voltage across capacitor 49 again becomes sufficiently high to break over zener diode 48, transistor 38 becomes forward biased and begins to conduct. When transistor 38 is turned on, the control of the duration of the pulses by power switch PS is returned to speed rheostat SRH.

An adjustable resistor 60 shown in dashed lines may be provided in parallel to transistor 38 to provide pulses of predetermined width by power switch PS during the interval that transistor 38 is turned off, thereby permitting adjustment of the motor torque during reversal of direction.

While only a single embodiment of the invention has been illustrated and described, it should be understood that I do not intend to be limited to the single embodiment for many modifications and variations thereof will be apparent to those skilled in the art.

The embodiments of the invention in which an exclusive property or privilege is claimed are defined as follows:

1. A soft-plugging power system for a vehicle comprising, in combination,
   a battery,
   a DC traction motor,
   means operated from said battery to produce a train of unidirectional pulses,
   monostable circuit means having an adjustable time constant element operated from said battery and driven by said train of unidirectional pulses to produce output pulses for controlling said traction motor,
   power switch means operated by said output pulses for applying current pulses from said battery to said traction motor,
   means for selectively varying said time constant element to control the time duration of said output pulses and thereby vary the vehicle speed,
   means for selectively reversing the polarity of the field winding of said traction motor to reverse the direction of motor rotation, and
   soft-plugging means responsive to the algebraic sum of the voltages across said power switch means and the armature of said motor while said motor is operating for varying and time constant element to decrease the repetition rate of said output pulses when said algebraic sum decreases to a predetermined voltage as said armature changes direction of rotation and the armature voltage is reduced.

2. A power system in accordance with claim 1 wherein said time constant element is a speed rheostat and said means for varying said time constant element includes a transistor in series with said speed rheostat.

3. A power system in accordance with claim 2 wherein the emitter-collector circuit of said transistor is in series with said speed rheostat and said means for varying said time constant element also includes the series arrangement of a capacitor and a zener diode connected across the base-emitter junction of said transistor and a capacitor-discharging resistance connected in series with said capacitor, a diode, said motor armature, and said power switch means.

4. A power system in accordance with claim 3 wherein said capacitor is connected in series with a charging resistance and said battery and said charging resistance is substantially greater than said capacitor-discharging resistance.

5. A power system in accordance with claim 2 and including variable impedance means in shunt to said transistor for selectively varying the time duration of said output pulses when said transistor is turned off.

6. In a soft-plugging speed control system for a vehicle having a DC power source,
   a DC traction motor,
   an oscillator pulse energized from said DC power source,
   a control pulse producing circuit triggered by the output pulses from said oscillator for producing control pulses of variable time duration,
   power switch means operated by said control pulses for applying variable duty cycle pulses to said motor from said DC power source,
   means for selectively reversing the polarity of the field winding of said traction motor to reverse the direction of motor rotation, and
   soft-plugging means monitoring the potential across the series arrangement of said power switch means and the armature of said traction motor while said motor is operating for decreasing the repetition rate of said control pulses from said control pulse producing circuit when said potential decreases below a predetermined magnitude as said armature reverses direction and the armature voltage decays.

7. In a speed control in accordance with claim 6 and including an armature diode connected across said motor armature and wherein said control pulse producing circuit includes a speed rheostat and said means for decreasing the repetition rate of said control pulses includes a controllable semiconductor in series with said speed rheostat.

8. In a speed control in accordance with claim 7 wherein said means for decreasing the repetition rate of said control pulses includes the serial arrangement of a capacitor and a zener diode connected across two of the electrodes of said controllable semiconductor, said capacitor being connected in a series circuit with a capacitor-discharging resistance, a diode, said motor armature, and said power switch means.

9. In a speed control in accordance with claim 8 wherein said semiconductor is a transistor having its emitter-collector circuit in series with said speed rheostat and said capacitor is connected across the base-emitter junction of said transistor, said capacitor also being connected in a series circuit with a charging resistance and said DC power source, said charging resistance being substantially greater than said capacitor-discharging resistance.

10. In a speed control in accordance with claim 8 and including variable impedance means in shunt with said semiconductor for selectively varying the repetition rate of said control pulses when said controllable semiconductor is nonconductive.

11. In a pulse width modulation control for a direct current traction motor having a power switch in series with the motor armature for supplying variable width current pulses from a direct current source to said armature, a monostable multivibrator for controlling the width of said pulses and including a timing capacitor for controlling the interval during which said multivibrator is in the semistable state, and a variable resistance in the discharge path for said timing capacitor for varying the interval during which said monostable multivibrator is in the unstable state, the improvement comprising,
   a controllable semiconductor in series with said variable resistance in said timing capacitor discharge circuit,
   means for normally turning said semiconductor on, and
   means monitoring the potential across the serial arrangement of said power switch and said motor armature for turning said semiconductor off when said potential falls below a predetermined potential as said armature reverses its direction of rotation, whereby the time constant of said timing capacitor discharge path is increased and the average current delivered to said motor armature is reduced during plugging.

12. In a pulse width modulation control in accordance with claim 11 and including variable impedance means connected in shunt to said semiconductor for selectively varying the interval during which said monostable multivibrator is in the unstable state when said semiconductor is turned off.

13. In a pulse width modulation control in accordance with claim 12 wherein said controllable semiconductor is a transistor and said means for normally turning said transistor on includes the serial arrangement of a capacitor and a zener diode connected across two of the electrodes of said transistor and means for charging said capacitor from said direct current source through a charging resistor, and wherein said means for turning said semiconductor off includes a diode and a capacitor-discharging resistance connected in a series circuit with said capacitor, said power switch and said motor armature, said capacitor-discharging resistance being substantially smaller than said charging resistance.

14. In a pulse width modulation control for a direct current traction motor having a power switch in series with the motor armature for supplying variable width current pulses from a direct current source to said motor, a timing capacitor, a speed changing variable resistance connected in an RC discharge path for said timing capacitor, and means responsive to the discharge of said timing capacitor to a predetermined voltage for initiating conduction by said power switch, the improvement comprising, a transistor having its emitter-collector circuit connected in series with said variable resistance in said timing capacitor discharge circuit, means for normally turning said transistor on while said motor is running, means for algebraically summing the voltage across said motor armature and said power switch, an means responsive to the output of said algebraic summing means decreasing below a predetermined voltage for turning said transistor off as said armature changes its direction of rotation, whereby the average current through said power switch to said motor is decreased during plugging.

15. In a pulse width modulation control in accordance with claim 14 wherein said means for normally turning said transistor on includes the serial arrangement of a capacitor and a zener diode connected across the base-emitter junction of said transistor, and said means for turning said transistor off includes a diode and a capacitor-discharging resistance connected in a series circuit with said capacitor and said algebraic summing means.

16. In a pulse width modulation control in accordance with claim 15 wherein said means for normally turning said transistor on also includes a charging resistance connected in a series circuit with said capacitor and said direct current source and the magnitude of said charging resistance is substantially greater than said capacitor-discharging resistance.

17. In a pulse width modulation control in accordance with claim 14 and including variable impedance means connected across said emitter-collector circuit for selectively varying the time constant of said timing capacitor discharge path when said transistor is turned off.

* * * * *

PO-1050
(5/69)

UNITED STATES PATENT OFFICE
CERTIFICATE OF CORRECTION

Patent No. 3,694,721   Dated September 26, 1972

Inventor(s) Luke F. Henry

It is certified that error appears in the above-identified patent and that said Letters Patent are hereby corrected as shown below:

Column 5, line 31, "and" should read --- said ---; line 63, "pulse" should be deleted. Column 8, line 7, "an" should read --- and ---.

Signed and sealed this 10th day of April 1973.

(SEAL)
Attest:

EDWARD M. FLETCHER, JR.
Attesting Officer

ROBERT GOTTSCHALK
Commissioner of Patents